Patented Jan. 14, 1941

2,228,791

UNITED STATES PATENT OFFICE 2,228,791

PURIFICATION OF VALUABLE HYDROCARBONS

Frank J. Soday, Upper Darby, Pa., assignor to The United Gas Improvement Company, a corporation of Pennsylvania No Drawing. Application June 14, 1938, Serial No. 213,626

8 Claims. (Cl. 260—668)

This invention pertains generally to the purification of hydrocarbons, and pertains particularly to the purification of resin-forming unsaturated hydrocarbons obtained from (1) gas condensates and tar oils produced in the manufacture of artificial gas; (2) cracked petroleum products; (3) coal tar distillates; and (4) synthetic sources such as processes for the manufacture of synthetic styrene.

The invention pertains more particularly to the purification of crude fractions of resin-forming unsaturated hydrocarbons derived from light oil, such as crude styrene, crude indene, crude methyl styrenes, isobutylene, crude cyclopentadiene, isoprene, butadiene, piperylene and the like.

In the various processes for the manufacture of artificial gas such as oil gas, carburetted water gas, or coal gas, considerable quantities of tar are produced, and the gas contains substantial quantities of other readily condensable materials.

The latter condensates as well as the distillate from the tar are generally known as light oil and are sources for many resin-forming unsaturated hydrocarbons such as indene, styrene, methyl styrene, cyclopentadiene, isobutylene, isoprene, piperylene, butadiene, etc.

With ordinary methods of fractional distillation as now practiced, it is impossible to separate the resin-forming unsaturated hydrocarbons in a substantially pure state because of the presence of other materials which apparently are either of similar boiling point or are capable of forming azeotropic mixtures with the desired hydrocarbon. Furthermore, many of these materials are polymerizable with heat which adds to distillation difficulties.

For instance, a typical styrene fraction obtained by ordinary distillation processes will contain hardly more than 50% styrene, and a typical indene fraction will contain hardly more than 80% indene.

Such fractions as well as those of lower and higher concentration are generally suitable for the manufacture of synthetic resins by polymerization, except that the resulting resins are very often too inferior with respect to color, color stability, electrical resistance, molding properties, freedom from crazing, thermal stability, melting point, specific viscosity, molecular weight and mechanical strength as to be of any considerable value.

I find that these deficiencies are generally traceable to the presence during the polymerization of certain contaminating materials.

While I have not as yet exactly determined the character of these impurities, experimental evidence indicates that they may be classified in certain specific groups.

For example, a typical styrene fraction obtained from light oil was analyzed and found to contain approximately 0.1% sulfur. This indicates that crude styrene fractions obtained from the above sources contain a relatively large quantity of sulfur containing materials such as mercaptans, disulfides, or derivatives of thiophene and related compounds.

Another portion was treated with a mercurating solution which resulted in the production of a copious precipitate. Precipitates obtained with different portions of the starting material varied in color from a faint yellow to a light brown. This indicates, among other things, the presence of superaromatic compounds such as substituted thiophene and thiophene homologues.

The treatment of various light oil fractions with ammoniacal cuprous chloride resulted in the formation of a heavy yellow precipitate. This indicates the presence of acetylenic compounds such as phenyl acetylene.

Similar tests made with pure styrene diluted with xylene to the same concentration as the crude styrene fractions treated above gave results which were negative in each case.

Other types of impurities are doubtless present also, although specific tests have not as yet been devised for their detection. Among these types of impurities may be included oxygenated compounds, organic peroxides and oxides, organic per acids, aldehydes, amines, and other reactive classes of compounds.

As indicated above it is difficult, if not impossible, to prepare a commercial grade of resin, such as polystyrene, from crude light oil fractions unless at least some of the contaminating impurities are removed.

While the exact influence of thes contaminating materials is not known it may be pointed out that they may act (1) as accelerators resulting in the production of polystyrene of relatively poor quality under polymerizing conditions which would normally result in the production of a good grade of polystyrene; (2) as inhibitors reducing the quantity of polystyrene obtained under normal polymerizing conditions; and/or (3) they may take part in the reaction and become an integral part of the resin molecule.

The presence of contaminating impurities in the polymer molecule would undoubtedly weaken it, causing the resin to be less stable to heat and to readily decompose with the formation of undesired color bodies.

The highly reactive nature of the resin-forming unsaturated hydrocarbons makes it extremely difficult to remove the contaminating impurities.

For instance, customary methods for the removal of impurities, such as sulfur compounds, diolefines and acetylenes, from cracked distillates in the manufacture of motor fuels removes most, if not all, of any styrene present.

It seems probable that any material which is sufficiently reactive to be capable of use for the purification of the crude resin-forming unsaturated hydrocarbons will react with them.

I have found that these unsaturated hydrocarbons may be refined by treatment with certain organic acids, either alone or in conjunction with certain solvents, such as water.

The following example will serve to illustrate the invention.

Example 1

A 500 cubic centimeter (426.5 grams) portion of a light oil styrene fraction containing 33.3 grams of styrene per 100 cubic centimeters of solution was treated with 20 grams of a 20% solution of oxalic acid in water at a temperature of 20° C. during a period of 10 minutes. The mixture was allowed to stratify for a period of several minutes, after which the sludge was removed.

The mixture was neutralized by the addition of 10 cubic centimeters of 20% sodium hydroxide solution, followed by moderate agitation to insure complete removal of all acidic compounds. The spent alkali was removed and the mixture was washed with successive portions of water until the washings were neutral to litmus, 700 c. c. of water being employed for this purpose.

The washing loss was 0.8%, by weight of the starting material.

The material then was dried over anhydrous sodium sulfate for a period of several hours. The drying loss was 4.3% of the total charging stock. The major portion of this loss was mechanical in nature.

The dried fraction then was distilled in vacuum resulting in a further loss of 1.1% by weight of the charging stock.

The total loss amounted to 6.2% of the fraction originally charged to the unit. A considerable portion of this loss undoubtedly could be eliminated by large scale operations.

The color of the refined styrene fraction was 1.5 on the Gardner color scale, compared with a color of 2.5 for the starting material on the same scale.

The refined material was examined to determine the extent to which it had been refined by means of the washing process. Qualitative tests with mercurous chloride, mercurous acetate and ammoniacal cuprous chloride solutions indicated that a considerable portion of the super-aromatic and acetylenic compounds had been removed by the treatment. In addition, approximately 90% of the sulfur compounds also had been removed.

A portion of the refined sample was polymerized for a period of 4 days at a temperature of 145° C. A resin yield of 32.0 grams per 100 c. c. was secured indicating that 90.2% of the styrene in the fraction originally charged to the unit had been recovered.

An additional sample of the refined styrene was polymerized for a period of 10 days at 100° C. The resin secured had a color of 1.0 on the Gardner color scale. A similar resin prepared from the unrefined material had a color of 2.0 on the same scale.

The resin prepared from the refined sample had a melting point of 166° C., whereas the melting point of the resin prepared from the unrefined sample was 154° C.

Other acids which may be employed are formic acid, acetic acid, monochloroacetic acid, dichloroacetic acid, trichloroacetic acid, citric acid, lactic acid, tartaric acid, succinic acid, and propionic acid. It will be noted that these acids are similar chemically not only in that they all contain a carboxyl group as the active acid constituent but also in that they are saturated and are aliphatic.

These acids may be used as such or in the form of solutions in various solvents, such as water and they may be used alone or in the form of mixtures containing two or more organic acids.

These acids also may be used in conjunction with certain mineral acids, or mixtures of mineral acids, for refining unsaturated hydrocarbons. For example, a crude indene cut may first be treated with an aqueous solution of formic acid, followed by treatment with 70% sulfuric acid.

In such procedure one obtains the advantage of first treating with a milder reagent to take out materials which would be highly reactive with inorganic acids. This avoids the necessity of very careful temperature control when using inorganic acids. High temperatures might cause polymerization of desired hydrocarbons.

Mineral acids and acid anhydrides that may be substituted for or added to sulfuric acid are any of the phosphoric acids, any of the phosphorous acids, $P_2O_5$, and $P_2O_3$.

While solutions of organic acids of any desired strength may be employed, I prefer to use acid of at least 50% strength, and up to say 90% strength. Acid of higher or lower strength may be employed. For instance, acid of lower strength may be used for purifying solutions of olefines and diolefines of higher concentration.

I find that solutions of organic acids of 50% to 80% concentration are very satisfactory, and that a solution of 70% concentration is excellent for all around purposes.

High concentrations lend themselves to conditions requiring more drastic treatment.

When using acid of relatively high concentration it may be advisable to follow the acid treatment with a water wash to reduce the quantity of alkali requireed for neutralization. The acid is soluble in the hydrocarbon to a degree varying with its strength and the water wash serves to remove a large part of this acid. Otherwise alkali would be used up for the same purpose.

Although any suitable proportion of acid may be employed, I prefer to use from 0.2% to 50% by volume based upon the material being treated.

I find that from 2% to 10% of acid by volume of the material under treatment gives very satisfactory results.

If desired suitable other additions may be made to the acid solution.

Examples of materials which might be added to the acid solution are (1) retarding agents, which have for their specific purpose the reduction of the effect of the acid upon the olefines, diolefines, and aromatic hydrocarbons present in the fraction, such as boric acid and other compounds of boron; (2) oxidizing agents, which have for their specific purpose the acceleration of the refining action of the acid, such as permanganates, dichromates, lead oxide, ferric oxide, and the like; (3) reducing agents, the function of which is to remove highly reactive impurities by means of nascent hydrogen, such as zinc dust, iron filings, aluminum powder, magnesium powder, tin dust, nickel powder and cadmium powder; and (4) inhibitors, the function of which is to inhibit the polymerization of the unsaturated hydrocarbons during the treating process, such as p-tertiary butyl catechol, 2-4 diamino-phenol dihydrochloride, 2-amino-5 hydroxytoluene, p-benzyl aminophenol, and 2-nitroso-beta-naphthol.

Any combination of (1), (2), (3) and (4) may be added if desired, although combinations of (2) and (4) are usually not used since their actions is, in general, opposed to each other.

Acid mixtures of which organic acid is one of the constituents may be used with excellent results. Examples of acids which may be mixed with the organic acids are acids or acid anhydrides containing phosphorus such as any of the phosphoric acids, any of the phosphorous acids, $P_2O_5$ and $P_2O_3$, sulfuric acid and sulfonic acids, such as benzene sulfonic acid, toluene sulfonic acid, xylene sulfonic acid, ethyl benzene sulfonic acid, etc.

While any suitable temperature may be employed during the various treating steps, I prefer to maintain the temperature between —40° C. and 75° C. Temperatures between approximately —10° C. and 30° C. are generally satisfactory. In other words, in any event the temperature should decrease with increase in acid concentration to avoid any considerable permanent discoloration of the hydrocarbon due to the strength of the acid. Permanent discoloration usually shows up after neutralization and washing with water since neutralization and washing remove any temporary discoloration due to the treatment. On the other hand, the temperature should not be so low as to render the acid inactive. Active acid usually becomes discolored during the treatment.

Unless certain precautions are observed, the addition of the neutralizing agent to the acid washed material may result in the formation of an emulsion.

I, therefore, prefer to add the neutralizing solution slowly and with moderate agitation, although alternate procedures may be employed.

Such alternate procedures include (a) the removal of the acid addition products by various solvents such as alcohol or glycerol before the alkali wash; (b) the addition of certain materials to the alkali wash such as liquid rosin, petroleum carboxylic acids, ethyl alcohol, oleic acid, and naphthenic acids; and (c) the addition of various emulsion inhibiting agents to the alkali wash such as aldehydes.

However, emulsions if formed can generally be broken by the addition of an absorbent material such as fuller's earth followed by filtering, or by the use of other suitable methods, such as electrical precipitation, the addition of various inorganic salts to the emulsion, and the like.

Any other suitable neutralizing agent may be employed for the removal of excess acid and acid residues from the material under treatment. Examples of such neutralizing agents are lime, $Na_2CO_3$, KOH, ammonia, fuller's earth, clay and activated carbon.

These neutralizing agents may be applied in the solid form, or in the form of solutions in water or other solvent. They may be used alone, or in combination with one or more other neutralizing agents, in which case they may be added to the treated solution together, or successively. For example, the acid-treated solution can be treated with clay to remove the major portion of the acid and sludge present, the clay and absorbed materials removed by filtration or by other suitable means, and solid $Na_2CO_3$ added to the solution to remove any residual acid or sludge present. Incidentally, this treatment usually serves to completely remove all of the water present in the treated solution, rendering unnecessary any further drying operations.

If desired, inert solvents such as petroleum naphtha and carbon tetrachloride may be added to the material under treatment either before or during the treating process.

Such materials are usually added to reduce the loss of olefines and diolefines present, although they may have other functions.

The crude fractions which may be treated by my process may have any reasonable boiling range. For instance, crude styrene fractions may have a boiling range of from 125° C. to 165° C. or wider, although I prefer to use crude styrene fractions with boiling ranges which do not greatly exceed 150° C. to 150°. C.

Excellent results are obtained when using crude styrene fractions with boiling ranges not exceeding 142° C. to 148° C.

What has just been said with respect to the boiling ranges of crude styrene fractions applies comparably to fractions of other unsaturated hydrocarbons.

For instance, a valuable methyl styrene fraction composed largely of para-methyl and meta-methyl styrenes is obtained from light oil when at least approximately 80% boils between 167° C. and 175° C. Likewise, a valuable indene fraction is obtained from light oil when at least approximately 80% boils between 177° C. and 186° C.

In general, and with all other conditions unchanged, the extent of purification will, generally speaking, be directly proportional to the narrowness in boiling range of the starting material.

Results comparable to those particularly set forth above in connection with styrene are obtained upon the polymerization of other light oil fractions such as methyl styrene and indene treated by my process.

As an example, a purified methyl styrene fraction may be polymerized by subjecting it to a temperature of 80° C. for a period of 8 days, followed by removal of unpolymerized material by vacuum distillation. The polymerized material has a color of 0.0 (water white) on the Gardner color scale.

Also as an example, a purified indene fraction may be polymerized by adding it to a suspension of 2.0% by weight of ferric chloride in toluene, followed by stirring for a period of three hours. The catalyst is then hydrolyzed by the addition of the theoretical amount of sodium hydroxide in the form of a 20% solution. The mixture then is filtered and the unpolymerized material removed by steam distillation. The polymerizated material has a color of 4.0 on the Gardner color scale.

Unwashed indene polymerized in a similar manner has a color of 8.0 on the Gardner color scale.

A crude styrene solution containing any quantity of styrene such as from 1.0% to 99% may be refined by my method.

Excellent results are obtained with styrene solutions containing from 10% to 80% styrene.

Comparable concentrations apply to the other unsaturated hydrocarbons refined by my method.

Further examples of such other unsaturated hydrocarbons are the other olefines and diolefines obtained from light oil, from drip oil (from gas mains), from coal tar, from cracked distillates, and from synthetic or other sources.

Contact between the material undergoing treatment and the treating material, namely acid, alkali, (or other neutralizing agent) or water may be accomplished by any means known in the art.

For instance, any suitable batch, multiple batch, batch countercurrent, continuous countercurrent, or continuous concurrent contacting apparatus and method may be employed.

In this respect reference is had particularly to the large number of processes and apparatus for leaching generally, for bringing mineral oil into contact with a chemical reagent, for the solvent extraction of mineral oils, etc., which may be adapted for carrying out the invention.

In certain cases it may be advisable to treat the unsaturated hydrocarbon, or fractions containing the unsaturated hydrocarbons, with successive portions of the acid solution in order to effect a more thorough purification of the hydrocarbon solution, or a more economical utilization of the acid mixture, or both. The batchwise addition of the acid mixture may be made with or without the removal of a portion or all of the acid and acid sludge from the preceding application and with or without additional refining steps, such as neutralization, drying, fractionation, and/or crystallization between successive batchwise additions of the acid refining agent.

In certain cases it may be found to be desirable to contact fresh charges of the unsaturated hydrocarbon fractions with spent acid solution and/or acid sludge and residues from the preceding refining step in order to secure greater economy in the use of the acid solution and/or a more thorough purification of the hydrocarbon fractions. The hydrocarbon fraction so treated may then be contacted with additional quantities of fresh acid solution, either with or without previously removing the acid sludge from the initial treatment and with or without additional refining steps, such as neutralization, drying, fractionation and/or distillation, and the refining operation completed in the normal manner, namely by separation of the respective layers, followed by neutralizing, drying, and/or distilling.

The treated material, of course, lends itself to further purification, should this be desired. Such further purification may be by contact with clay, with activated carbon, or with diatomaceous earth at any suitable temperature, or by distillation at any desired pressure, or by partial polymerization followed by removal of undesirable constituents, or by fractional crystallization, or by other physical or chemical means.

By operating my process more drastically it may be employed to completely remove the olefines and diolefines present in the material undergoing treatment leaving the aromatic hydrocarbons, naphthenes and/or paraffins unchanged. Special solvents may be prepared in this manner.

Other variations will become apparent to persons skilled in the art upon becoming familiar with this invention.

The treating process as outlined in the example listed may be greatly simplified in most cases. For example, I find that styrene solutions may be refined in a satisfactory manner by treatment with the acid followed by the application of clay or activated carbon, either alone or in conjunction with other neutralizing agents, such as sodium carbonate or lime, and the removal of all solid material from the treated solution by filtration or by other suitable means. No further treatment is usually necessary.

The term "permanent color" as used in the claims is intended to mean color which remains after the removal of acid and acid reaction products such as by neutralization and water washing followed by distillation.

It is, therefore, to be understood that the above examples are by way of illustration and that changes, omissions, additions, substitutions, and/or modifications might be made within the scope of the claims without departing from the spirit of the invention which is intended to be limited only as required by the prior art.

I claim:

1. A process for the purification of the resin-forming unsaturated hydrocarbon content of a light oil fraction which comprises contacting said light oil fraction in the liquid phase with a reagent comprising acid selected from a group consisting of oxalic acid, formic acid, acetic acid, monochloroacetic acid, dichloroacetic acid, trichloroacetic acid, citric acid, lactic acid, tartaric acid, succinic acid, and propionic acid, said acid being at least 50% in concentration, said contact of said fraction and said reagent taking place at a temperature below 75° C. and under conditions including acid concentration and temperature sufficiently drastic to remove color forming bodies but insufficiently drastic to polymerize a large part of said resin-forming unsaturated hydrocarbon content and insufficiently drastic to add any appreciable permanent color to said fraction, and removing said reagent from said fraction.

2. A process for preparing a refined cut of a resin-forming unsaturated light oil hydrocarbon which is highly resistant to color formation when subjected to conditions for the polymerization of said unsaturated hydrocarbon which comprises subjecting light oil to fractional distillation to obtain a cut of said unsaturated hydrocarbon, treating said cut in the liquid phase with from 0.2% to 50% by volume of acid selected from a group consisting of oxalic acid, formic acid, acetic acid, monochloroacetic acid, dichloroacetic acid, trichloroacetic acid, citric acid, lactic acid, tartaric acid, succinic acid, and propionic acid, said acid being at least 50% in concentration, said treatment taking place at a temperature below 75° C. and under conditions including acid concentration and temperature sufficiently drastic to remove color forming bodies but insufficiently drastic to polymerize a large part of said resin-forming unsaturated hydrocarbon and insufficiently drastic to add any appreciable permanent color to said cut, and removing said reagent from said cut.

3. In a process for the purification of a resin-forming unsaturated hydrocarbon derived from light oil, the steps of treating said hydrocarbon in the liquid phase with acid selected from a group consisting of oxalic acid, formic acid, acetic acid, monochloroacetic acid, dichloroacetic acid, trichloroacetic acid, citric acid, lactic acid, tartaric acid, succinic acid, and propionic acid, said treatment taking place at a temperature below 75° C. and under conditions including acid concentration and temperature sufficiently drastic to remove color forming bodies but insufficiently drastic to polymerize a large part of said resin-forming unsaturated hydrocarbon and insufficiently drastic to add any appreciable permanent color to said hydrocarbon, and removing said reagent from said hydrocarbon.

4. A process for preparing a refined solution of a resin-forming unsaturated light oil hydrocarbon which is highly resistant to color formation when subjected to conditions for the polymerization of said unsaturated hydrocarbon which comprises subjecting light oil to fractional distillation to obtain a relatively close cut of said unsaturated hydrocarbon, treating said cut with from 2% to 10% by volume of acid selected from a group consisting of oxalic acid, formic acid, acetic acid, monochloroacetic acid, dichloroacetic acid, trichloroacetic acid, citric acid, lactic acid, tartaric acid, succinic acid, and propionic acid, said acid being from 50% to 80% in concentration, said treatment taking place at a temperature between −10° C. and 30° C. but sufficiently low to avoid adding any appreciable permanent color to said hydrocarbon due to the strength of said acid, and then removing residual acid from said cut.

5. In a process for the purification of a resin-forming unsaturated hydrocarbon derived from light oil, the steps of treating said hydrocarbon in the liquid phase with oxalic acid, said treatment taking place at a temperature below 75° C. and under conditions including acid concentration and temperature sufficiently drastic to remove color forming bodies but insufficiently drastic to polymerize a large part of said resin-forming unsaturated hydrocarbon and insufficiently drastic to add any appreciable permanent color to said hydrocarbon, and removing said reagent from said hydrocarbon.

6. A process for preparing a refined styrene cut which comprises subjecting light oil produced in the manufacture of artificial gas to fractional distillation to obtain a cut the preponderate part of which boils between 142° C. and 148° C., treating said cut with from 2% to 10% by volume of at least one of a group consisting of oxalic acid, formic acid, acetic acid, monochloroacetic acid, dichloroacetic acid, trichloroacetic acid, citric acid, lactic acid, tartaric acid, succinic acid, and propionic acid, said acid being from 50% to 80% in concentration, said teratment taking place at a temperature between −10° C. and 30° C. but sufficiently low to avoid adding any appreciable permanent color to said cut and to avoid polymerizing a large part of said styrene due to the strength of the acid, and removing residual acid from said styrene cut.

7. A process for preparing a refined methyl styrene cut which comprises subjecting light oil produced in the manufacture of artificial gas to fractional distillation to obtain a cut the preponderate part of which boils between 167° C. and 175° C., treating said cut with from 2% to 10% by volume of at least one of a group consisting of oxalic acid, formic acid, acetic acid, monochloroacetic acid, dichloroacetic acid, trichloroacetic acid, citric acid, lactic acid, tartaric acid, succinic acid, and propionic acid, said acid being from 50% to 80% in concentration, said treatment taking place at a temperature between −10° C. and 30° C. but sufficiently low to avoid adding any appreciable permanent color to said cut and to avoid polymerizing a large part of said methyl styrene due to the strength of the acid, and removing residual acid from said methyl styrene cut.

8. A process for preparing a refined indene cut which comprises subjecting light oil produced in the manufacture of artificial gas to fractional distillation to obtain a cut the preponderate part of which boils between 177° C. and 186° C., treating said cut with from 2% to 10% by volume of at least one of a group consisting of oxalic acid, formic acid, acetic acid, monochloroacetic acid, dichloroacetic acid, trichloroacetic acid, citric acid, lactic acid, tartaric acid, succinic acid, and propionic acid, said acid being from 50% to 80% in concentration, said treatment taking place at a temperature between −10° C. and 30° C. but sufficiently low to avoid adding any appreciable permanent color to said cut and to avoid polymerizing a large part of said indene due to the strength of the acid, and removing residual acid from said indene cut.

FRANK J. SODAY.